United States Patent [19]

Whitworth

[11] 4,367,593

[45] Jan. 11, 1983

[54] PATTERN DRAFTING TOOL

[76] Inventor: Loraine T. Whitworth, 5024 S. Sunkist Pl., Tucson, Ariz. 85706

[21] Appl. No.: 301,456

[22] Filed: Sep. 14, 1981

[51] Int. Cl.³ .............................................. G01B 3/14
[52] U.S. Cl. ................................................ 33/174 N
[58] Field of Search ............... 33/174 N, 21 C, 174 R, 33/174 J, 174 P, 175, 1 G, 1 CC

[56] References Cited

U.S. PATENT DOCUMENTS

| | | | |
|---|---|---|---|
| 2,095,059 | 10/1937 | Donnelly | 33/174 J |
| 3,082,537 | 3/1963 | Solomon | 33/174 N |
| 3,129,512 | 4/1964 | Schiler | 33/21 C |

*Primary Examiner*—Harry N. Haroian
*Attorney, Agent, or Firm*—Cahill, Sutton & Thomas

[57] ABSTRACT

The drafting tool provides true length measurements for laying out and forming a pattern of a transition between two conduits. A post, pivotally positionable upon a base, is angularly oriented commensurate with the longitudinal axis of the transition if the ends are non parallel, otherwise it is vertical and the post includes indicia representative of the mean height of the transition. A first bar positionable in each of a plurality of fixed radial positions about the post has indicia representative of the radius of the conduit from which the transition is to extend. An indicator is slidably positionable along the bar and supports a measuring device for measuring the true length from predetermined radials to predetermined points upon the bottom of the transition. A second bar extending radially from the post also has indicia representative of the radius of the conduit and which indicia cooperates with a scaled arm pivotally attached to the indicator to provide a measurement of the chord length intermediate two radials intersecting the circumference of the to be defined upper end of the transition. A cammed pivoting mechanism supports the post to maintain true height readings upon its indicia. The base is retainingly positionable upon a plate or a pipe to develop a pipe layout for a pipe miter. A fixed length rod extending from the indicator of the first bar is employed to determine the layout pattern.

12 Claims, 16 Drawing Figures

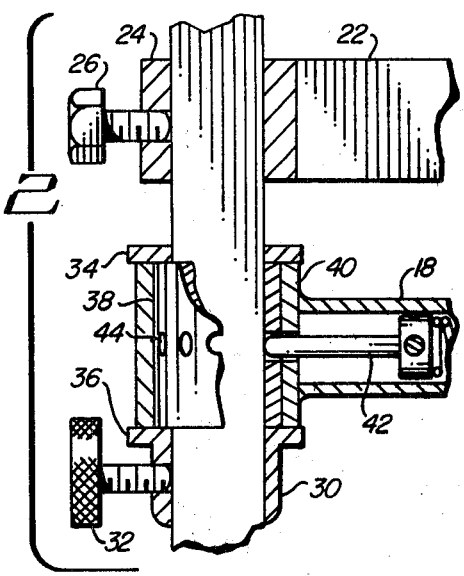
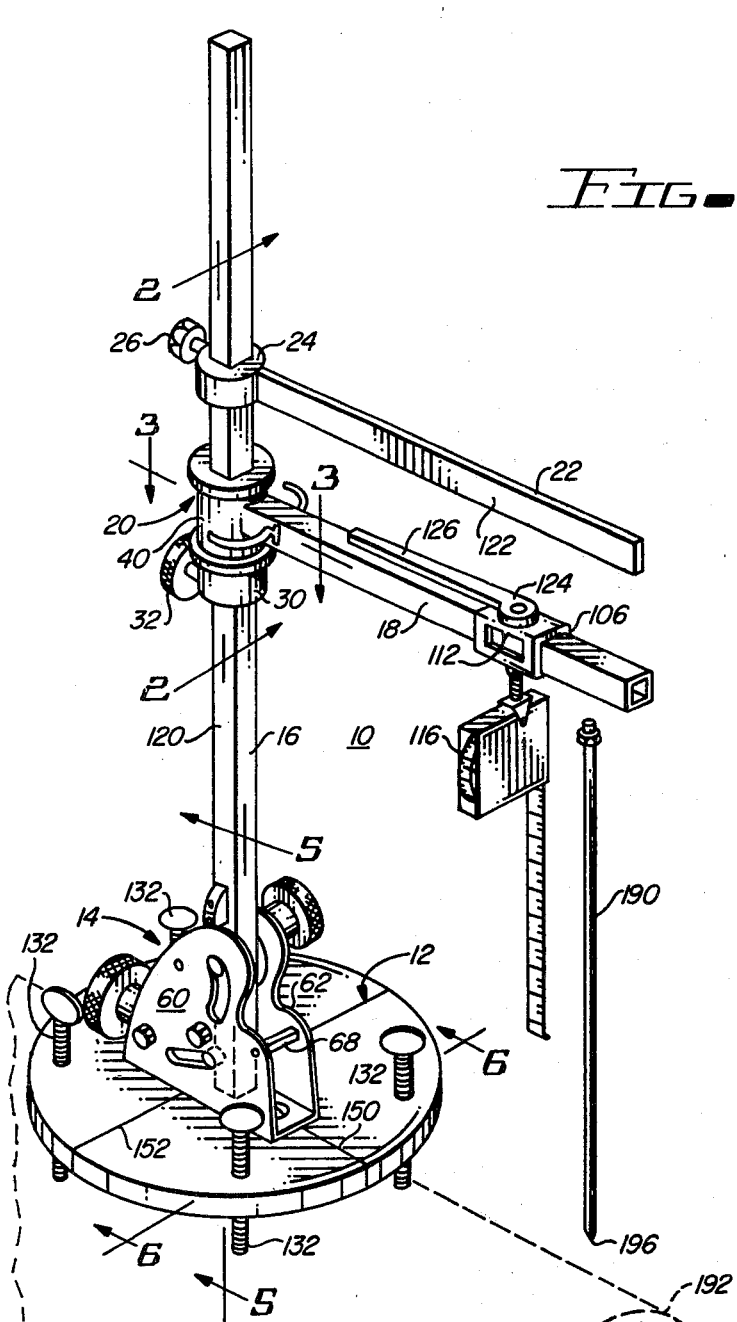
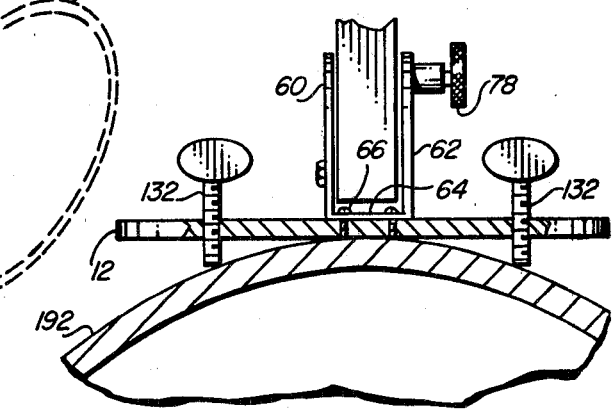

PATTERN DRAFTING TOOL

The present invention relates to drafting tools, and, more particularly, to drafting tools for developing patterns from true length measurements.

Wherever pipes or conduits are employed, transitions between round conduits to rectangular conduits or plenums must often be built. Likewise, miter joints between the same or differently sized pipes must often be effected. The state of the art procedure for developing the requisite layouts or patterns is that of using the skills of a draftsman to develop the various views which ultimately produce a pattern for the transition or joint sought. While this procedure produces accurate patterns, it is not particularly efficient; the pipe fitter must either be a skilled draftsman or a draftsman must be available when needed to produce the requisite pattern. The man hours needed of highly paid technicians constitute a substantial expense. Moreover, lack of availability of the requisite personnel often results in delays in completing the work and incurs substantial additional expenses associated therewith.

To alleviate the time and man power requirements attendant the drafting by conventional techniques of sheet metal layouts, various devices and apparatus therefor have been developed. U.S. Pat. No. 3,129,512 is directed to a post mounted marker for making a layout in the three-dimensional planes of a solid object. The marker is slidably positionable laterally and slidably positionable vertically upon a base mounted post. Indicia reflective of measurements in both axis is incorporated. U.S. Pat. No. 3,949,481 illustrates uniquely configured drafting templates for constructing two-dimensional sheet patterns defining a cylindrical article. U.S. Pat. No. 4,215,481 describes an instrument for establishing points of curved lines for the purpose of laying out segments of round sheet metal elbows of many different sizes. The instrument is preferably a planar transparent element having indicia formed therein.

The present invention is directed to a tool for obtaining with facility true length measurements which, when drawn up, produce an accurate pattern of the transition or miter joint to be built.

It is therefore a primary object of the present invention to provide a drafting tool for obtaining true length measurements for the pattern of a transition between a circular conduit and a rectangular conduit.

Another object of the present invention is to provide a drafting tool for making a pattern either on or off site for a transition.

Yet another object of the present invention is to provide a drafting tool for sheet metal craftsman when developing transitions of various types by using true length measurements to obtain the pattern for the transition.

Still another object of the present invention is to provide a drafting tool useable on site to develop the pattern for a pipe miter joint.

A further object of the present invention is to provide a drafting tool useable by pipe fitters with little or no drafting skills and yet develop accurate patterns for transitions and pipe miter joints.

A yet further object of the present invention is to provide a tool for reducing the number of man hours attendant the fabrication in sheet metal of a transition.

A still further object of the present invention is to provide a drafting tool for developing patterns of great accuracy from true length measurements.

These and other objects of the present invention will become apparent to those skilled in the art as the description thereof proceeds.

The present invention may be described with greater specificity and clarity with reference to the following drawings, in which:

FIG. 1 is an isometric view of the drafting tool;

FIG. 2 is a cross-sectional view taken along lines 2—2, as shown in FIG. 1;

FIG. 5 is a cross-sectional view taken along lines 5—5, as shown in FIG. 1;

FIG. 6 is a cross-sectional view taken along lines 6—6, as shown in FIG. 1;

Figures 3, 4, 9:
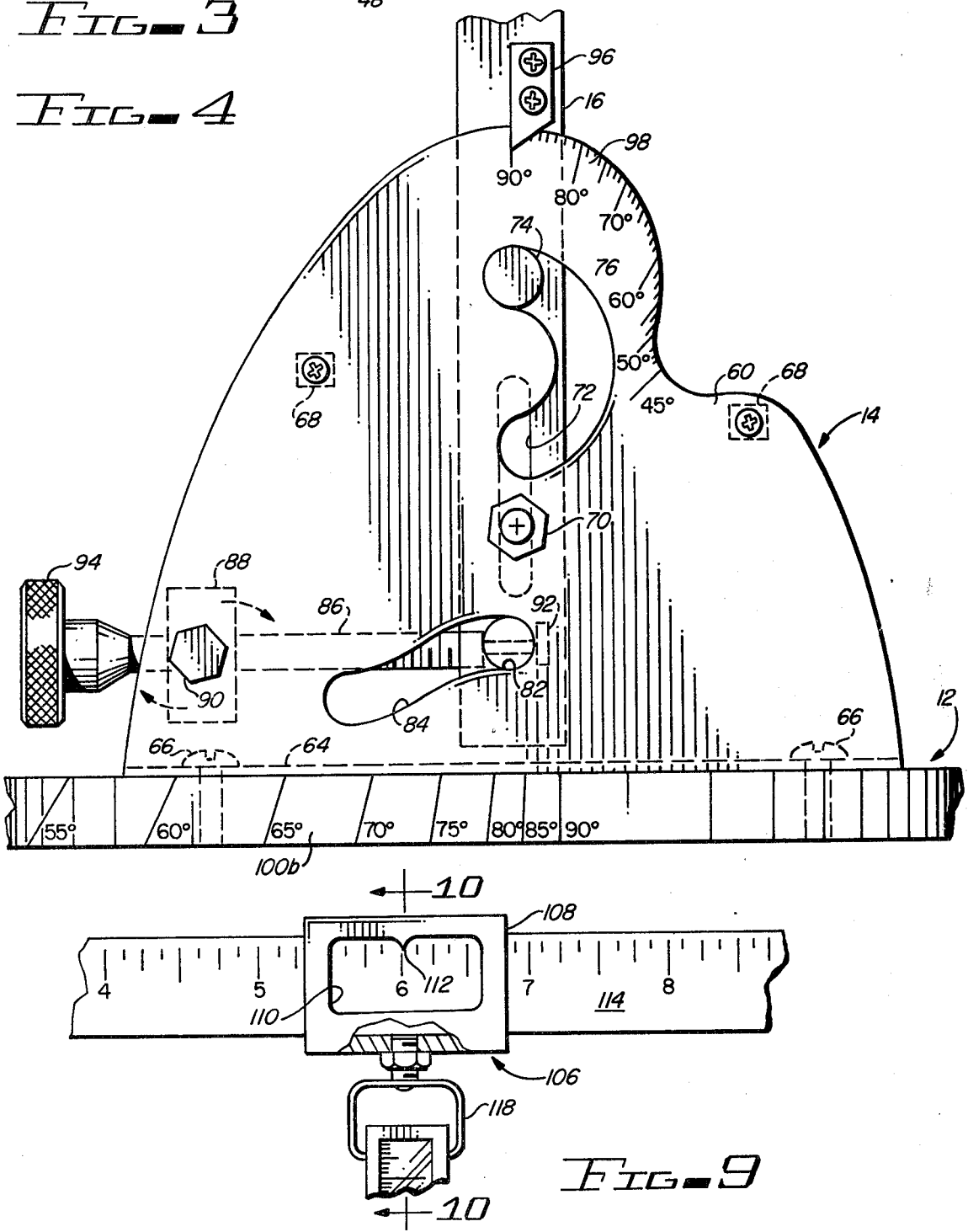
FIG. 3 is a cross-sectional view taken along lines 3—3, as shown in FIG. 1.
FIG. 4 is a detailed side view of the post mounting assembly.
FIG. 9 is a detailed view of the bar mounted indicator.

Referring to FIG. 1, there is shown an isometric view of a drafting tool 10 manifesting the concepts of the present invention. The drafting tool includes a base 12 having a pivotal mounting apparatus 14 for supporting post 16. A first bar 18 extends laterally from the post and is mounted thereon through module 20. A second bar 22 also extends laterally from the post and is secured thereto by collar 24.

Module 20 supporting bar 18 will be described in detail with joint reference to FIGS. 1, 2 and 3. A sliding member 30 is nonrotatably mounted upon post 16, which post may be square in cross-section as illustrated. A thumb screw 32 is employed to position member 30 at a predetermined height along the post in conformance with measurement indicia (120) disposed upon the post. Member 30 includes a pair of annular radially extending flanges 34, 36 defining a cylindrical surface 38 therebetween. A sleeve 40 is disposed intermediate the flanges and supported upon the cylindrical surface whereby the sleeve is rotatable about but not along the longitudinal axis of member 30. Bar 18 is welded or otherwise secured to sleeve 40 on a radial thereof and perpendicular to the longitudinal axis of the sleeve. The bar is located and maintained along one of a plurality of 16 selected equiangular radials of post 16 by a spring loaded plunger 42 engaging one of 16 cavities 44 disposed within cylindrical surface 38; each cavity is identified by one of numerals 0/16, 1, 2 ... 15 located upon the top/end surface of module 20. As particularly illustrated in FIGS. 2 and 3, plunger 42 is slidable within and guided by aperture 46 disposed in sleeve 40. Actuation of plunger 42 may be effected by sliding movement of arms 48 extending in opposed directions through slots 50, 52 within opposed walls of bar 18.

Second bar 22 is mounted slidable along but nonrotatable about post 16 through collar 24. The collar may be locked at any predetermined height along the post by actuation of thumb screw 26. And the bar may be positioned along one of 4 equiangular radials.

Pivotal mounting apparatus 14 will be described with primary joint reference to FIGS. 1, 4, 5 and 6. A pair of parallel opposed brackets 60, 62 are attached to and extend upwardly from base 12. The attachment means may be an interconnecting plate 64 attached to base 12 by machine screws 66, or the like. The plate, in conjunction with spacers 68, maintain the brackets in fixed position relative to one another to accommodate and support pivotal movement of post 16 therebetween.

A bolt 70 extends between and is fixedly secured to brackets 60, 62 and penetrably engages slot 72 disposed within the post. A rod 74 extends from opposed sides of post 16 into close tolerance engagement with curved camming slot 76 disposed in aligned relationship in each of brackets 60, 62. A friction locking knob 78 threadedly engages a threaded stud 80 extending from rod 74; upon tightening of knob 78, rod 74 becomes locked at any location within slots 76.

A rod 82 is rotatably mounted within the lower part of post 16 and extends laterally therefrom in opposed directions into close tolerance sliding engagement with opposed camming slots 84. A threaded rod 86 is mounted in threaded engagement with a block 88, which block is pivotally supported intermediate plates 60, 62 by bolts 90 extending thereinto from opposed sides of the brackets. The terminal end of threaded shaft 86 extends through and is rotatably mounted within rod 82. Axial movement of the shaft with respect to rod 82 is precluded by member 92. Alternatively, the terminal end of shaft 86 and member 92 may be the shaft and head of a bolt threaded into the end of shaft 86. A hand wheel 94 is attached to threaded shaft 86 to manually effect rotation thereof.

A pointer 96 is attached to post 16. It correlates with first indicia 98 disposed upon bracket 60 to reflect the angle of the longitudinal axis of post 16 with respect to the plane defined by base 12. The correlating edge of bracket 60 is curved to accommodate and match the movement of the pointer as the post is rotated.

Figure 7:
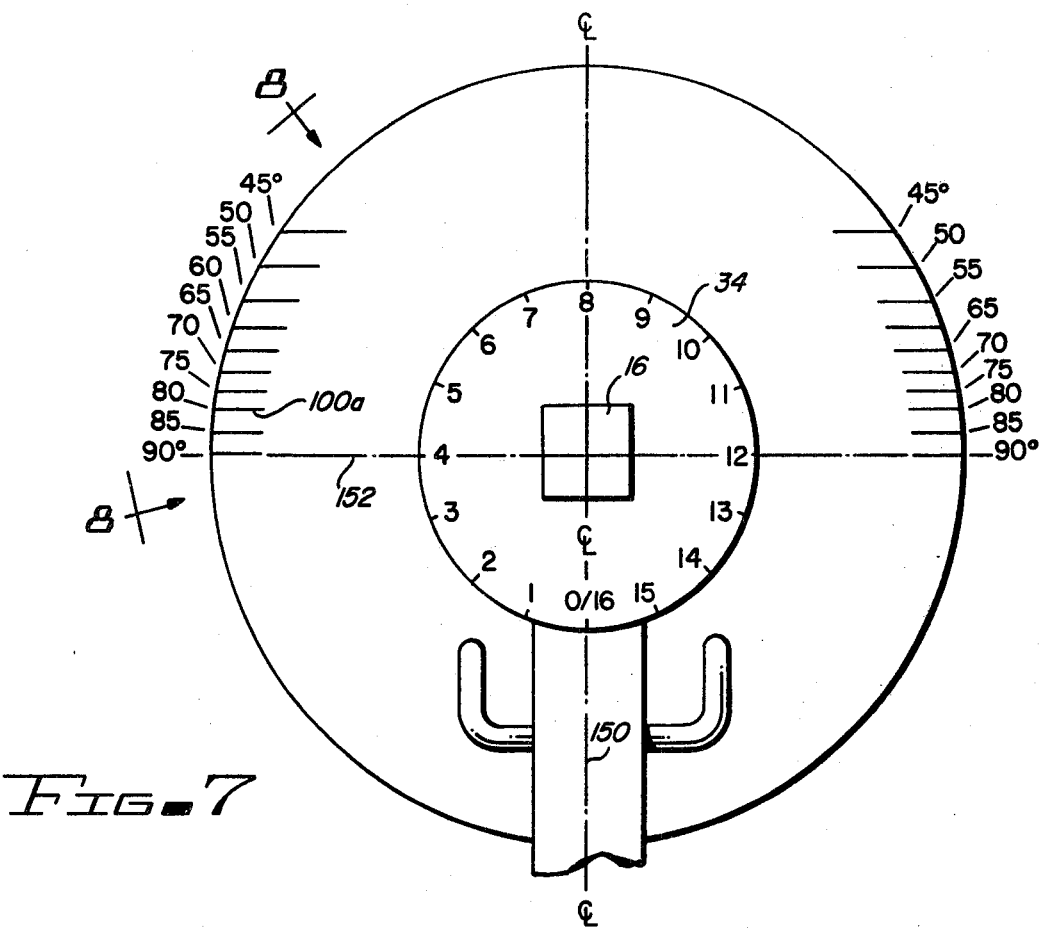
FIG. 7 is a partial top view of the base.
Figure 8:
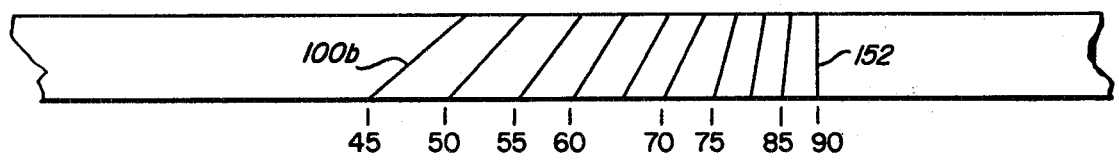
FIG. 8 is a side view taken along lines 8—8, as shown in FIG. 7.

As particularly shown in FIGS. 7 and 8, base 12 includes second indicia 100a, 100b on the top and side surfaces, respectively, which indicia is reflective of the reference line or scribed line (152) upon which the base is to be placed and depending upon the angle at which post 16 is set.

Upon rotation of thumb wheel 94, the lower end of post 16 will be repositioned with respect to block 88. The extend of angular repositioning of the post from vertical will be reflected by the angular notation upon first indicia 98. The function of camming slots 76 and 84 in combination with their respective engaging rods and the sliding and pivotal movement of the post via slots 72 about bolt 70 will angularly and longitudinally reposition the post such that the distance between module 20 and a line in the second indicia (100a, 100b) corresponding to the angle of first indicia 98 identified by pointer 96 always remains the same irrespective of the angle to which the post is repositioned.

Figure 10:
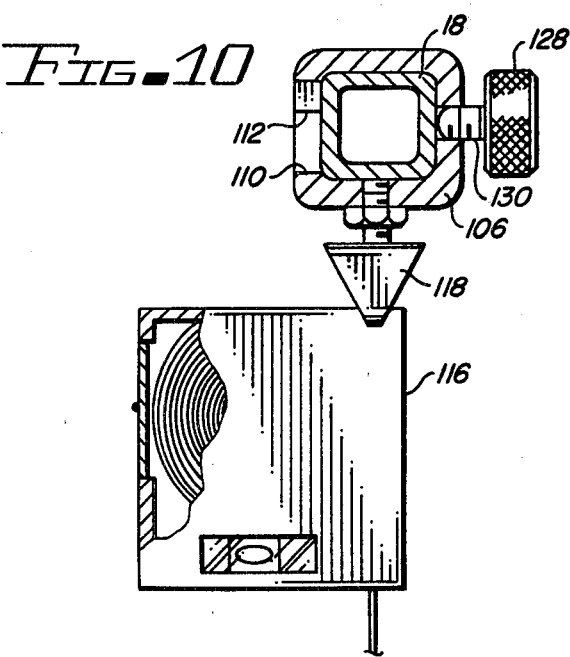
FIG. 10 is a partial cross-sectional view taken along lines 10—10, as shown in FIG. 9 and illustrating a direct reading length measurement device attached to the indicator.

Referring jointly to FIGS. 1, 9 and 10, radius indicator 106 will be described. The radius indicator includes a collar 108 slidably mounted upon bar 18 in relative close tolerance therewith to minimize slop therebetween. Indicator 106 is positionally retained in place by a thumb screw 128 frictionally engaging bar 18 by a threaded shaft 130. The collar may include a window 110 having a pointer 112 disposed therein, which pointer cooperates with third indicia 114 disposed upon one side of the bar. The third indicia is reflective of the radius of one end of the transition to be laid out. A tape measure 116 or other true distance measuring device is dependably attached to radius indicator 106 by a yoke 118 or similar supporting means. The tape measure is suspended by the supporting means such that a measurement made therewith defines a line intersecting with the radius identified by pointer 112 and from a predetermined elevation point with respect to bar 18 (such as the cursor upon module 20).

Fourth indicia 120 is disposed upon one face of post 16 which indicia correlates with the height of the transition to be laid out and further correlates with a fixed elevation point upon bar 18 and the corresponding measurement to be made with tape measure 116. The lower edge of module 20 may serve as a cursor in cooperative relationship with fourth indicia 120; other means may be employed to provide the capability of setting the fixed elevation point of bar 18 at the height of the transition to be laid out.

Second bar 22 includes fifth indicia 122 disposed therealong which indicia is positionally and numerically equivalent to third indicia 114 disposed upon first bar 18.

An arm 124 is pivotally secured to indicator 106 at a point lateral to pointer 112 whereby the pivot point of the arm with respect to bar 18 is the same as the distance along the bar identified by point 112. Sixth indicia 126 is disposed along arm 124.

Referring jointly to FIGS. 1 and 6, apparatus will be described for positioning base 112 upon a curved surface, such as a pipe to which a second pipe is to be attached. Two pairs of machine screws 132, located upon diagonals perpendicular to one another threadedly engage base 12. The position of each of these machine screws is vertically adjusted to locate the undersurface of base 112 in contact with and upon a pipe 192 and prevent tipping thereof, as shown in FIG. 6.

Figure 12:
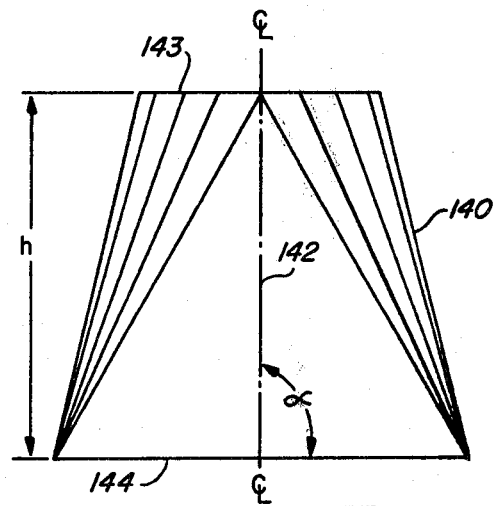
FIG. 12 illustrates a side view of the transition shown in FIG. 11.
Figures 11, 14, 15, 16:
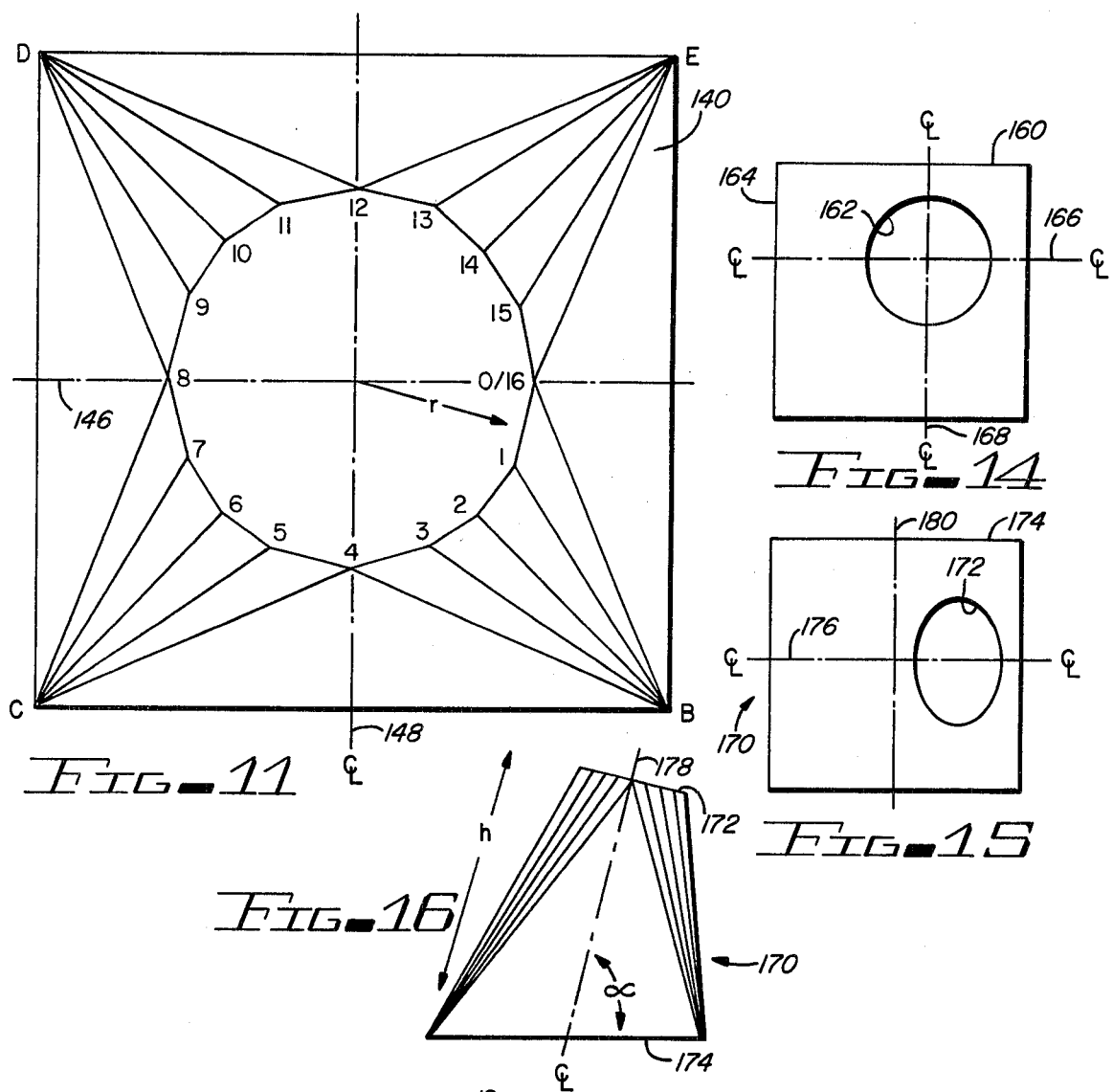
FIG. 11 illustrates a top view of a representative symmetrical transition from a circular cross-section to a rectangular cross-section.
FIG. 14 illustrates a top view of a non-symmetrical transition.
FIG. 15 illustrates a top view of a transition having a sloping top.
FIG. 16 illustrates a side view of the transition shown in FIG. 15.
Figure 13:
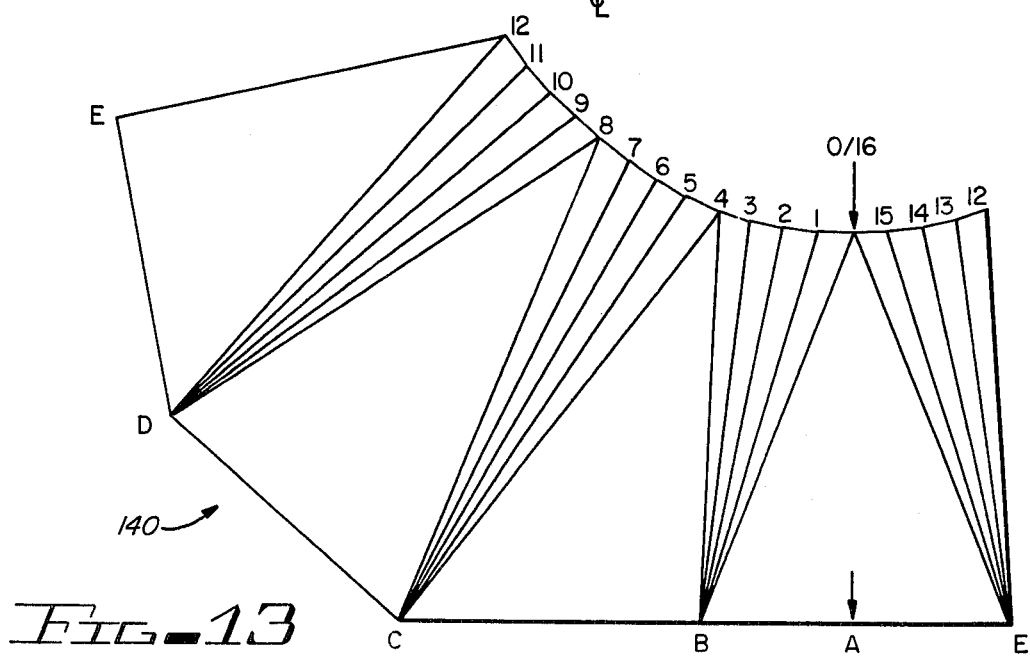
FIG. 13 illustrates the pattern developed for the transition shown in FIG. 11.

The operation of the present invention will be described with respect to transition 140 illustrated in FIGS. 11, 12 and the pattern therefor shown in FIG. 13. The top 142 and bottom 144 of the transition are parallel which dictates that post 16 is to be positioned vertical to base 12 of drafting tool 10. Accordingly, knob 94 is rotated to bring pointer 96 into correspondence with the 90° mark on first indicia 98. Center lines 146, 148 of transition 140, as shown in FIG. 11, are scribed upon a layout table or steel plate. Base 12 is positioned upon the layout table to locate scribed line 150 of second indicia 100a and 100b in base 12 in alignment with center line 146 and scribed line 152 of second indicia 100a and 100b in base 12 in alignment with center line 148. Thumb screw 32 of module 20 is loosened to permit raising or lowering of the module until the cursor thereof is positioned with respect to fourth indicia 120 commensurate with the height, h, of the transition, as shown in FIG.

12. Plunger 42 is retracted from engagement with one of cavities 44 and bar 18 is rotated to position the plunger in correspondence with the cavity marked 0/16. Bar 18 will now be in alignment with center line 146 in correspondence with the point marked 0 in FIG. 11. Thumb screw 26 is loosened to lower bar 22 directly atop and in alignment with bar 18. The spacing therebetween is approximately commensurate with the thickness of arm 126. Radius indicator 106 is positioned along bar 18 to a point on third indicia 114 corresponding to radius, r, (see FIG. 11); thereafter, thumb screw 128 is tightened to maintain the radius indicator in place. At this point, all settings of drafting tool 10 have been performed and measurements of various critical lines may proceed.

It is assumed that square bottom B, C, D and E of the transition has been marked upon the layout table. A point midway between B and E is marked and designated as A. In developing the pattern, as shown in FIG. 13, a line B–E is drawn with a point midway therealong identified as A. Using the set up drafting tool, a measurement is taken with tape measure 116 to point A; this is a true length measurement between points 0, A and line 0-A is drawn on the pattern perpendicular to line B-E. A second true length measurement is taken with tape measure 116 to point B. A line of corresponding length is drawn on the pattern between points 0, B. Bar 18 is now rotated to position 1 by withdrawing plunger 42 from the cavity corresponding to position 0/16 rotating the bar about post 16 until plunger 42 engages the cavity corresponding to position 1. The location of point 1 on the pattern is determined by swinging arm 124 toward the previously set arm 22 until the edge of the arm intersects a numeral of fifth indicia 122 corresponding to radius (r). The resulting dimension indicated on arm 126 corresponds with the distance 0–1 which is equivalent to the chord between points 0, 1. An arc centered upon point 0 and having a radius of the chord is drawn upon the pattern. A true length measurement of line 1-B is obtained by extending the tape of tape measure 116 to point B. A further arc centered on point B and equivalent in length to the measured distance 1-B is drawn to intersect the chord arc. The intersection locates the position of point 1 on the pattern. True length line 2-B is obtained by withdrawing plunger 42 from cavity 1 and rotating the bar until the plunger engages cavity 2. A further arc having a radius equivalent to the previously obtained chord length is drawn centered upon previously established point 1. A true length measurement is obtained with tape measure 116 to point B, which measurement corresponds with the length of line 2-B. An arc centered on point B and commensurate with the length of line 2-B is drawn to intersect chord length 1-2; the point of intersection identifies point 2. To obtain the brake pitch information necessary for the formation of the transition, arm 126 is repositioned to intersect the point of fifth indicia 122 on bar 22 equivalent to radius (r); the resulting dimension indicated on arm 126 is noted on the pattern and identified as the brake pitch. Lines 3-B and 4-B are identical to lines 1-B and 0-B, respectively; moreover, lines 2–3 and 3–4 are identical to either lines 0–1 or 1–2. Use of drafting tool 10 to obtain further dimensions for the pattern of the transition is not necessary because the one fourth pattern established above is repetitive for the symmetrical transition illustrated in FIGS. 11–13 and all subsequent dimensions necessary are known.

FIG. 14 illustrates a transition 160 having a top 162 offset from a bottom 164. It is assumed that the planes defined by the top and bottom are parallel. None of the quadrants for the pattern of transition 160 are identical and a full pattern of true length lines must be developed. To employ drafting tool 10, center lines 166 and 168 are laid out and base 12 of the tool is located thereon in the manner described above with respect to transition 140. And, deployment of the tool is in the manner described above except that bar 18 must be serially positioned in each of positions 0 to 16 with appropriate true length measurements made at each position.

A transition 170 having a top 172 and bottom 174 not in planes parallel to one another, that is, sloping with respect to one another is shown in FIGS. 15, 16. Such a transition may also be laid out by employment of drafting tool 10. The height of bar 18 is set by positioning module 20 such that its cursor corresponds with a dimension on fourth indicia 120 equivalent to the length (h) defined along the axis extending through the geometric center of top 172 and bottom 174. Previously, the scribed lines (150, 152) of base 12 of drafting tool 10 were located with respect to the orthogonal center lines of the top of the transition (140, 160) but for transition 170, a different alignment is effected. Scribed line 150 is aligned with center line 176. Angle α of axis 178 is determined and scribed line 152 corresponding with the angle, indicated by second indicia 100a and 100b, is aligned with center line 180. Thereafter, thumb wheel 94 is rotated to tilt post 16 with respect to base 12 until pointer 96 is opposite angle α on first indicia 98. The drafting tool has now been set to provide the true length measurements necessary to develop a pattern for transition 170. As transition 170 is symmetrical about one center line, the measurements for only a one half pattern need be obtained as the remaining half of the pattern is a duplicate. The manner of obtaining the measurements follows that described with respect to transition 140.

Drafting tool 10 may be employed to provide a pipe layout pattern for a pipe miter joint to be fixed at any angle with respect to one another. To obtain the requisite pattern, the following procedure is employed. Post 16 is set at the angle corresponding to the angle between the two pipes to be joined. A rod 190 is attached to indicator 106 as a replacement for tape measure 116. It may be necessary to raise bar 22 to provide sufficient height for bar 18 to accommodate the length of rod 190.

Base 12 is mounted upon a pipe 192 such that scribed line 150 corresponds with the longitudinal axis of the pipe (192) and scribed line 152 is centered upon the axis of the pipe being joined to pipe 192; the selection of scribed line 152 of second indicia 100a and 100b is made to correspond with the angle between the two pipes. Machine screws 132 are set to stabilize base 12 upon pipe 192 in the manner shown in FIG. 6. The base is secured to the pipe with a strap (not shown). Thumb screw 32 is loosened to permit free travel of module 20 along post 16. And, bar 18 is located about post 16 at the 0 position by appropriate engagement of plunger 42. Radius indicator 106 is positioned along bar 18 until pointer 112 is located commensurate with the inside radius of the pipe to be joined to pipe 192. It is to be understood that rod 190 is aligned with pointer 112 and parallel to post 16.

The measurements for the pipe layout pattern are obtained as follows. Bar 18 is permitted to slide downwardly along post 16 until point 194 of rod 190 contacts the surface of pipe 192. A reading of fourth indicia 120 corresponding to the cursor of module 20 is noted. Bar 18 is relocated to position 1 and allowed to slide downwardly until point 194 again comes into contact with the surface of pipe 192 and another reading of fourth indicia 120 is obtained. Further readings are similarly obtained for each of positions 2 to 8. The resulting measurements recorded, in combination with the respective angular positions, provide sufficient information to draw a half pattern which need only be duplicated to obtain a full pattern for the pipe layout.

It may be readily appreciated that the above described procedure for developing a pipe layout pattern can be used for the pattern of a pipe necessary for interconnection with a planar surface. For such interconnection, base 12 is placed on a flat surface, post 16 is angled to the appropriate angle and radius indicator 106 is set to correspond with the outer radius of the pipe to be attached.

It is to be understood that extensions to bars 18, 22, respectively, arm 124 and post 16 may be employed when necessary to accommodate the size of the transition or pipe layout being patterned. Moreover, base 12 may be magnetic or include magnetic elements for securely maintaining the base upon the layout table when such layout table is a steel plate. Such magnetic attraction capability may be of assistance in retaining the base upon the pipe, as described above.

From the above description of the capabilities of drafting tool 10, it may be appreciated by those skilled in the art that the various plan views, elevation views, projections and triangulations necessary to develop patterns for transitions and pipe layouts by conventional drafting techniques are mechanically accomplished; thereby, great labor savings can be effected and accuracy is enhanced as only a group of measurements need be converted into variously interconnecting lines to develop a pattern.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A drafting tool for determining true length measurements for patterns of transitions and pipe miter joints, said tool comprising in combination:
   (a) a base for defining a plane of reference for one edge of the pattern to be developed;
   (b) a post extending upwardly from said base, said post including indicia correlatable with the reference plane and the longitudinal dimension of the pattern to be formed;
   (c) a bar extending radially from said post, said bar being positionable angularly about the longitudinal axis of said post in any one of several predetermined positions, said bar including indicia correlatable with the lateral dimensions of one end of the transition or joint being patterned;
   (d) an indicator repositionable along said bar to correspond with the lateral dimension;
   (e) means for determining the true length distance between said indicator and at least one point lying on the one edge of the pattern for each radial position of said bar; and
   (f) means for obtaining the true length distance between adjacent positions of said indicator on repositioning said bar; whereby, the true length distances obtained in combination with the known angular repositioning of said bar provide sufficient information to draft directly the pattern sought.

2. The tool as set forth in claim 1 including means for angularly repositioning said post with respect to said base while maintaining the integrity of indicia correlatable with the longitudinal dimension of the pattern to be formed.

3. The tool as set forth in claim 2 wherein said determining means comprises a length measuring device.

4. The tool as set forth in claim 3 wherein said obtaining means comprises a further bar extending radially from said post and an arm extendable from said indicator to said further bar for establishing the distance to a predetermined point on said further bar.

5. The tool as set forth in claim 2 wherein said base includes indicia for reflecting the angle at which said post is set with respect to said base.

6. The tool as set forth in claim 5 wherein said determining means comprises a length measuring device.

7. The tool as set forth in claim 6 wherein said obtaining means comprises a further bar extending radially from said post and an arm extendable from said indicator to said further bar for establishing the distance to a predetermined point on said further bar.

8. The tool as set forth in claim 1 wherein said determining means comprises a fixed length rod.

9. The tool as set forth in claim 8 including means for angularly repositioning said post with respect to said base while maintaining the integrity of indicia correlatable with the longitudinal dimension of the pattern to be formed.

10. The tool as set forth in claim 9 wherein said base includes indicia for reflecting the angle at which said post is set with respect to said base.

11. The tool as set forth in claim 10 wherein said obtaining means comprises a further bar extending radially from said post and an arm extendable from said indicator to said further bar for establishing the distance to a predetermined point on said further bar.

12. A method for determining true length measurements for patterns of transitions and pipe miter joints, said method comprising the steps of:
   (a) defining a plane of reference for one end of the pattern to be developed and defining selected lateral points and dimensions therebetween of the corresponding end of the transition or pipe miter joint;
   (b) establishing a longitudinal dimension of the transition or pipe miter joint for the pattern to be developed;
   (c) setting lateral points of another end of the transition or pipe miter joint;
   (d) determining the true length distance between the selected lateral points of one end of the transition or pipe miter joint and selected ones of the lateral points of the other end of the transition of pipe miter joint; and
   (e) obtaining the true length distance between adjacent ones of the selected ones of the lateral points on the other end of the transition or pipe miter joints to be patterned.

* * * * *